June 28, 1960  S. G. BEST ET AL  2,942,417
TEMPERATURE CONTROL WITH DEGENERATIVE FEEDBACK FOR A FUEL SYSTEM
Filed March 24, 1955  2 Sheets-Sheet 1

INVENTORS
STANLEY G. BEST
CHARLES B. BRAHM
BY Harris G. Luiker
ATTORNEY

INVENTORS
STANLEY G. BEST
CHARLES B. BRAHM
BY Harris G. Lucher
ATTORNEY

United States Patent Office 2,942,417
Patented June 28, 1960

2,942,417

TEMPERATURE CONTROL WITH DEGENERATIVE FEEDBACK FOR A FUEL SYSTEM

Stanley G. Best, Manchester, and Charles B. Brahm, Windsor Locks, Conn., assignors to United Aircraft Corporation, East Hartford, Conn., a corporation of Delaware Filed Mar. 24, 1955, Ser. No. 496,588

5 Claims. (Cl. 60—39.28)

This invention relates to control means and particularly to temperature responsive fuel control means for limiting engine temperature.

More specifically it relates to a device utilizing a D.C. error signal fed to a vibrator type D.C. amplifier controlling a hydraulic servo follow-up correction device in a proportional system, i.e., a system which makes correction for error proportional to the error.

In designing a proportional system responsive to small fluctuating D.C. error indicating potentials, in addition to the problem of obtaining amplification of the D.C. voltage there is a problem of stability of the entire system. The amount of amplification permissible in a stable system is dependent upon the time constants of the various elements in the system. It is usually the ratio of the two longest time constants in the system which limit the permissible amplification of the entire system while retaining stability.

In the well known method of determining stability of an entire system, the signals or response are considered as varying sinusoidally and the gain of each element, or group of elements, which may be considered as having a single time constant, is plotted against frequency giving curves which usually show a constant gain at the low frequencies up to a point called the breaking point which is determined by the time constant of the element, the curve then slants down or up at a 45° angle when plotted on a logarithmic graph, depending on whether the element gain decreases or increases with further increase in signal frequency and continues at the same angle or again becomes a constant gain dependent on whether the element gain continues to change with frequency or does not change further with frequency. The individual curves of the elements entire system may be plotted on logarithmic graph paper so that the curves may be added to give the gain vs. frequency curve of the entire system.

The lines at 45°, i.e., a one to one ratio, indicate a phase margin of 90° and the lines at two to one ratio, i.e., the sum of two 45° lines, indicate a phase margin of 0° and indicate marginal stability. A system in which the response was 180° out of phase with the input would have 0° phase margin (phase margin being the angle between the actual phase angle between the input and output signals, and 180°), and have marginal stability. If the response was 360° out of phase with the input there would be resonance and the system would oscillate and be unstable. On phase relations between 180° and 360°, that is 0° to minus 180° phase margin, the system would be unstable but on phase relations between 180° and 0, that is 0 to plus 180° phase margin the entire system would be stable, becoming more stable as the phase margin increases. For many installations phase margins of 30° to 70° are considered satisfactory and desirable.

By plotting curves as above it is possible to theoretically analyze the entire system and determine its stability. It is usual to take a gain of one as the cut off frequency point, i.e. the point at which the output signals of the system will no longer follow a sinusoidal input signal. In order to obtain a good stable system the cut off frequency should be at a point on the composite curve which would indicate a phase margin of 30° to 70°. From the above general analysis it will be evident that if the cut off frequency falls in an unsatisfactory part of the curve and the system has elements whose gain can be changed, as by changing the feed back characteristics of an amplifier, the composite curve can be moved up or down on the gain ordinate by changing the amplifier gain and thus changing one of the curves which determine the position of the composite curve, to bring the cut off frequency at a desired point on the composite curve. In the present invention the amplifier is modified by a feed back first to increase static sensitivity and delay the response at lower frequencies and second to improve the stability of the system at the higher frequencies, compensating for secondary lags in the system.

The present invention utilizes a system as outlined above in an engine fuel control in which a temperature responsive element provides the small fluctuating D.C. signal and a D.C. chopper amplifier amplies the signal which is then fed to a proportional solenoid operating a flapper valve controlling the bleed from a servo control for a fuel pump controlling the flow of fuel which controls the temperature to which the temperature responsive element is responsive. The basic amount of fuel is manually controlled and the present invention acts as a temperature limiting device which can override the manual control and act to maintain a selected operating temperature for steady state control or, in accelerating, from an undertemperature condition to an overtemperature condition, when the manual control supplies sufficient fuel to cause overheating, the present invention acts to slow down the response by reducing the gain of the system, to permit a limited overtemperature condition or a limited time interval of over temperature.

An object of this invention is a control which will override the normal control and reduce the flow of heating medium upon a sustained temperature above a predetermined limit.

A further object is control mechanism which will have a high static sensitivity and low dynamic sensitivity in a proportional type system.

A further object is a control system having an amplifier with a negative feed back which will provide a high gain with the attendant high sensitivity for steady state control and also for high rates of change but will provide a low gain for intermediate rates of change.

A further object is a feed back system for a D.C. amplifier having means temporarily feeding a degenerative feed back signal upon a change in polarity of the D.C. input and means for limiting the extent of the delay.

Other objects and advantages will be apparent from the following specification and attached drawings in which.

In fuel controls for turbine engines and particularly in the type of fuel control in which the power output is determined by throttle positions and in which the throttle positions normally determine the engine speed and temperature, it is desirable to incorporate mechanism limiting the maximum temperature attainable under steady state conditions. It is desirable to have a somewhat higher maximum temperature during acceleration to thus allow temporary overtemperature conditions and during such accelerations it is desirable to delay the response of the fuel limiting controls to the temperature error signals so as to permit the temporary overtemperature conditions.

The present invention deals with such systems having a hydro-mechanical fuel control with an electronic temperature sensitive override for limiting the maximum temperatures attainable. In the hydro-mechanical portion, the fuel flow is manually selected and is normally maintained at the selected value. The selected value is however reduced by means of the electronic control whenever the engine temperature exceeds a predetermined value. If the engine is operating under steady state conditions, the temperature control will have no effect until the engine temperature is at or above the selected temperature. If the temperature is substantially steady at the selected maximum temperature, the electronic control has a high gain as it has substantially no negative feed back and is therefore in position to effect a rapid and substantially instantaneous control which will give high static sensitivity. If however the maximum temperature is reached during an acceleration from an undertemperature condition, a negative feed back due to the condensers and resistors in the feed back circuit may be substantial so that the amplifier will have very little effect until the condensers become charged in the opposite direction so that the electronic control will be delayed in its application of the force to then turn any control to cut back the fuel and a temporary overtemperature condition may exist during the acceleration.

Figure 1:
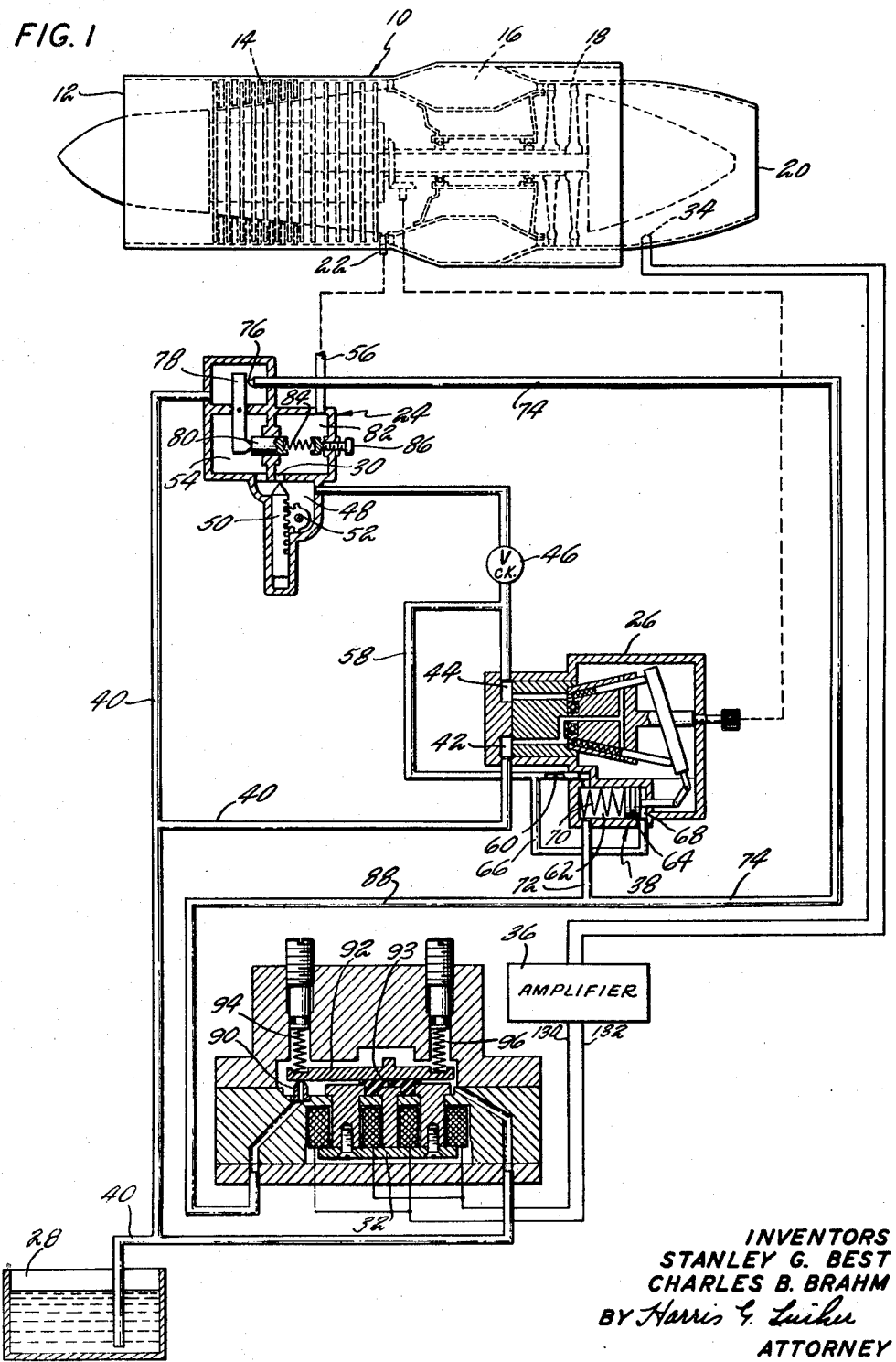
Fig. 1 is a schematic view showing the general combination of a manual fuel control and an overriding temperature responsive control controlling the output of the fuel pump.

In the device shown for purposes of illustrating this invention but not as a limitation thereof, a turbine jet type of engine indicated generally at 10 having inlet 12, a compresser 14, a combustion chamber 16, turbine 18 and exit or discharge 20 has fuel injection nozzles 22, injecting into combustion chamber 16 fuel metered by a fuel metering device 24 and supplied by an engine driven pump 26 pumping fuel from a reservoir 28. The pump may be a fixed delivery pump not shown or a variable delivery pump, as shown in Fig. 1, whose output is controlled by the pressure drop across the fuel nozzle 30 in the fuel metering device 24 and also controlled by proportional solenoid 32 which in turn is controlled by the thermocouple 34, in the turbine discharge, acting through the amplifier 36. The pump 26 which has been illustrated in Fig. 1 as a wobble type of pump has its stroke controlled by a servo-mechanism 38. Fuel is drawn from the reservoir 28 through line 40 and into pump intake chamber 42. It is discharged from the pump through outlet chamber 44 and through check valve 46 to the high pressure side 48 of the nozzle 30, whose area is controlled by the needle valve 50 which may be manually or otherwise positioned by the pinion 52. Fuel at the pump discharge pressure is also admitted to chamber 54. After passing metering nozzle 30 fuel is fed through line 56 to the injection nozzle 22 where it is discharged to combustion chamber 16. A bleed 58 is led from between the check valve 46 and the pump discharge chamber 44 through a restriction such as orifice 60 to the chamber 62 at one side of the piston 64 of the servo-mechanism 38. Fuel at the pump discharge pressure is also led through line 58 and line 66 to the chamber 68 at the other side of the piston 64. Pressure in chamber 68 will tend to reduce the pump stroke and hence the quantity of fuel fed to the turbine, while the pressure in chamber 62 and the spring 70 tend to increase the pump stroke and thus increase the quantity of fuel fed to the engine. Bleed line 72 has one branch 74 leading to a nozzle 76 controlled by a flapper valve 78 which in turn is positioned by a piston 80 having fuel at pump pressure in the chamber 54 acting on one side thereof and fuel at the pressure in chamber 82 downstream of the nozzle 30 acting on the other side thereof assisted by adjustable spring 84. Piston 80 has its opposite sides, therefore, subjected to the pressure on the opposite sides of the nozzle 30 and will hence move the flapper valve 78 in accordance with variations in the pressure drop across the nozzle which pressure drop may be adjusted by the screw 86 adjusting the tension of spring 84. As the pressure drop across the nozzle 30 is increased either by an increase in the pressure of chamber 54 or a decrease in the pressure in the chamber 82, the valve 78 will be moved to open nozzle 76 and hence bleed chamber 62 of the servo-mechanism 38 and thus reduce the pump stroke which in turn will reduce the pressure drop across the nozzle by reducing the pressure in chamber 54. Hence, valve 78 and its associated mechanism will tend to maintain a fixed pressure drop across the fuel metering nozzle 30 which will maintain constant fuel flow for a fixed position of valve 50. A second bleed line 88 is connected with the bleed 72 and terminated in an orifice 90 controlled by a flapper valve 92 which in turn is positioned by centering springs 94 and 96 and adjustable by the proportional solenoid 32. Solenoid 32 is a polarized solenoid whose pull is balanced against the discharge from nozzle 90. Its operation is well known in the art. A more detailed explanation of its method of operation is given in application Ser. No. 471,152 of Sims and Farkas filed December 26, 1954, to which reference may be made for further details. In the present applications however the balance is against the orifice discharge instead of against a third follow-up spring as in said application. Fluid discharge from the orifice 76 and from the orifice 90 is led back to the pump inlet or the reservoir by means of line 40. The inlet restriction 60 has a small flow capacity, say about 1/5, compared to the flow capacity of either of the wide open nozzles 76 or 90.

Solenoid 32 is actuated by signals received from a temperature responsive element 34 and is connected so that temperatures above a preselected value will actuate the valve 92 to uncover nozzle 90 and thus bleed chamber 62 through pipe 88 and reduce the pump stroke to thereby feed less fuel to the engine and cause a temperature reduction. It should be noted that while both nozzles 76 and 90 bleed from the same chamber, if one of them, say the nozzle 90, is bleeding to reduce the pump stroke and prevent overheating, the other, say nozzle 76, will close in an attempt to increase the pressure drop across the nozzle and hence will in effect become inactive so that the entire control is transferred to nozzle 90 in overtemperature conditions.

The same action would be true in the event nozzle 76 is controlling and nozzle 90 is closed in order to endeavor to increase the pump stroke to bring the temperature up to the selected value. Nozzle 76 will then bleed to maintain the predetermined pressure drop across the nozzle 30, while nozzle 90 will be completely closed and ineffective in undertemperature conditions.

It will, of course, be understood that other bleed lines may be added if desired. For instance, if it is desired to limit the compresser pressure, a bellows responsive to compresser pressure could be used to actuate another bleed to, in a similar manner, control the pump stroke. It will be apparent that the parameter which exceeds the predetermined or selected limit will do the controlling and the bleeds responsive to the remaining parameters will be closed and ineffective.

While a single throttle 50 and orifice 30 have been shown, it should be understood that other metering devices may also be utilized to vary the control by the main throttle. These other orifices can be adjustable and made responsive to other selected variables such as altitude.

Amplifier 36 for modifying signals fed from the temperature element 34 to the control 32 is shown in more detail in Fig. 2 to which reference will now be made. Temperature responsive element 34 leads into a cold junction compensator 100, which is a well known mechanism compensating for variations in cold junction temperature to maintain the thermocouple output responsive to temperature in the tail pipe and not affected by variation in ambient temperatures. The signal from the thermocouple is compared with a fixed direct current voltage such as plus 85 volts from the voltage regulator circuit of the power pack 102 which receives its power from any convenient alternating current system such as the airplane alternating current system. The 85 volts is fed in on line 104, through a voltage divider 105, and compared at point 106 of the voltage divider with the thermocouple signal fed in on line 108. The voltage difference between the voltage fed to lines 108 and the voltage at point 106 of the voltage divider is the temperature error which is fed in on line 110, through dropping resistors, to the contacts 112, 114 of the vibrator 116, the swinger 118 of which is connected with ground. The vibrator will thus form a square wave with 0 volt or ground as one peak of the square wave and the temperature error as the other peak. The square wave is fed through condensers 120, 122 to the tubes 124, 126 of the amplifier. The amplified square wave is chopped by chopper 128 synchronized with the chopper 116 to conduct a selected peak of the amplified square wave to the proportional solenoid through amplifier output lines 130 and 132.

A filtering network 134 is connected to the line 130 to reduce the effect of the inductiveness of the proportional solenoid and thereby increase the power to the solenoid.

From the above description, it will be apparent that the amplifier will amplify the positive or negative direct current temperature error signal received on line 110 and provide an amplified error signal on line 130. The chopper 128 is connected so as to utilize the square wave peak which will give a voltage reversal through the amplifier. That is, a thermocouple overtemperature signal which is negative, on line 110 to the amplifier input, will appear as an amplified positive control signal on the output line 130. This positive signal is used as a degenerative feed back which is fed through line 136, resistor 137, line 138 and resistors 140 and 142 to the input lines 144 and 146 connected with the vibrator contacts 112 and 114. A condenser 148 in this feed back line will prevent direct current from being fed back during steady state, i.e. no voltage variations in the line 130, conditions. Upon temperature changes which will produce voltage variations in the line 130, a feed back signal will be fed back through the lines 144 and 146 while the condenser 148 is charging or discharging. For instance, assume the engine to be running in an undertemperature steady state condition which is the normal operating condition, there will be no feed back through the line 138 and the amplifier will have a high gain because there will be no negative feed back to reduce the gain and the condenser 148 will be charged with a potential representing the difference in voltage between the line 138, connected with the amplifier input, and the line 136, connected with the amplifier output. In this undertemperature condition the right-hand plate of the condenser 148 will be negative and the left-hand plate will be positive, as the undertemperature input signal is positive and the undertemperature output signal is negative.

If now the pilot opens the throttle 30 to allow more fuel to enter the engine, the engine will be raised to a higher temperature. If the temperature remains below the preselected temperature so that the thermocouple output has a lower negative value than the voltage divider positive value at point 106, the temperature error appearing in line 110 remains positive but less positive than under the previous steady state condition then the output signal in line 130 will still be negative and acting to try to close nozzle 90 but will be less negative than under the previous steady state condition. Under these conditions condenser 148 will be discharged to the lower potential difference between the amplifier input and output and thus discharging current will flow in a direction to provide a negative feed back which will oppose the change and thus in effect reduce the amplifier amplification. This reduction in amplifier output will however not affect the valve 92 as the output signal is still an under temperature signal and negative and as long as the signal in line 130 remains negative, or is zero, the valve 92 will remain closed.

With the condenser 148 charged as above indicated for an undertemperature condition, if the temperature should suddenly increase to a point where the thermocouple will emit a negative signal greater than the positive signal from the reference source at junction 106, then the amplifier will attempt to put out a positive signal to open the valve 92. Before any positive signal can be put out by the amplifier; however, it is necessary to discharge condenser 148 and charge it in the opposite direction, that is, make the right-hand plate positive and the left-hand plate negative. This charging process will take an appreciable length of time as it is part of a RC circuit, during which time the feed back circuit will apply a voltage in line 138, and to the input lines 144 and 146 opposing this change. That is the feed back circuit will apply a positive potential through the line 138 to the lines 144, 146 opposing the negative potential applied as a temperature error so that the amplifier output for an appreciable length of time after the thermocouple indicates an over temperature may actually be negative indicating an undertemperature. Because of this feature, it is possible to accelerate the engine by quickly opening the throttle and permitting a temporary over heating during the acceleration. As soon as the condensers are charged or the charging rate falls off to a point where the feed back signal is less than the input signal to the amplifier, then the amplifier will produce a positive output signal for the negative overtemperature input signal, and the proportional solenoid receiving the positive signal will proceed to reduce the pump stroke and the fuel flow.

The proportional solenoid is so constructed that the bleed through nozzle 90 is proportional to the voltage input to the solenoid and hence as the condenser 148 becomes charged and the feed back becomes less and the amplification of the amplifier becomes greater, the proportional solenoid will open the valve 92 wider to quickly reduce the pump stroke and bring the temperature back to the limited temperature.

It has been found that in some cases when the acceleration started from a condition of considerable undertemperature that the engine might seriously over heat during acceleration before the condenser 148 became completely discharged and charged in the opposite direction sufficient to open valve 92 and cut back the fuel flow. In order to limit the extent to which the condenser can charge in an undertemperature condition, a rectifier 150 is connected to ground between resistor 137 and condenser 148. The convention used in this application is current as opposed to electron flow and that current will flow from positive to negative and the rectifier arrow is shown in the direction of current flow. If the condenser righthand plate charges to negative on under temperature, the rectifier will limit the amount of negative charge possible on the condenser to the contact potential of the rectifier. By thus limiting the charge on the condenser 148, it is possible to reduce or limit the time required to discharge the condenser and charge it in the opposite direction when accelerating from an undertemperature condition. It is thus possible to limit the maximum overtemperature attainable during acceleration.

In order to assist in stabilizing the system and compensate for some other lags in the system, a condenser 152 is connected to ground between the resistor 137 and the condenser 148. This condenser will act to by pass signals, other than direct current signals, to ground, acting to pass a larger portion of a variable signal as the frequency increases until at the higher frequencies it will pass substantially the entire variable component, leaving substantially nothing to pass through condenser 148 as a feed back signal. At the higher frequencies therefore the voltage at junction 154 in the feed back will be substantially 0 and the amplifier will be restored to full gain. The effect of condenser 152 is to insert into the system an element which will produce an increasing gain with increases in signal frequency, producing an upwardly sloped curve on a gain vs. frequency curve. Such a structure will act to improve the phase margin and make the system more stable if the curve has a value such that it will be effective to improve an operating portion of the composite curve, i.e. at a gain greater than one.

Figures 2, 3:
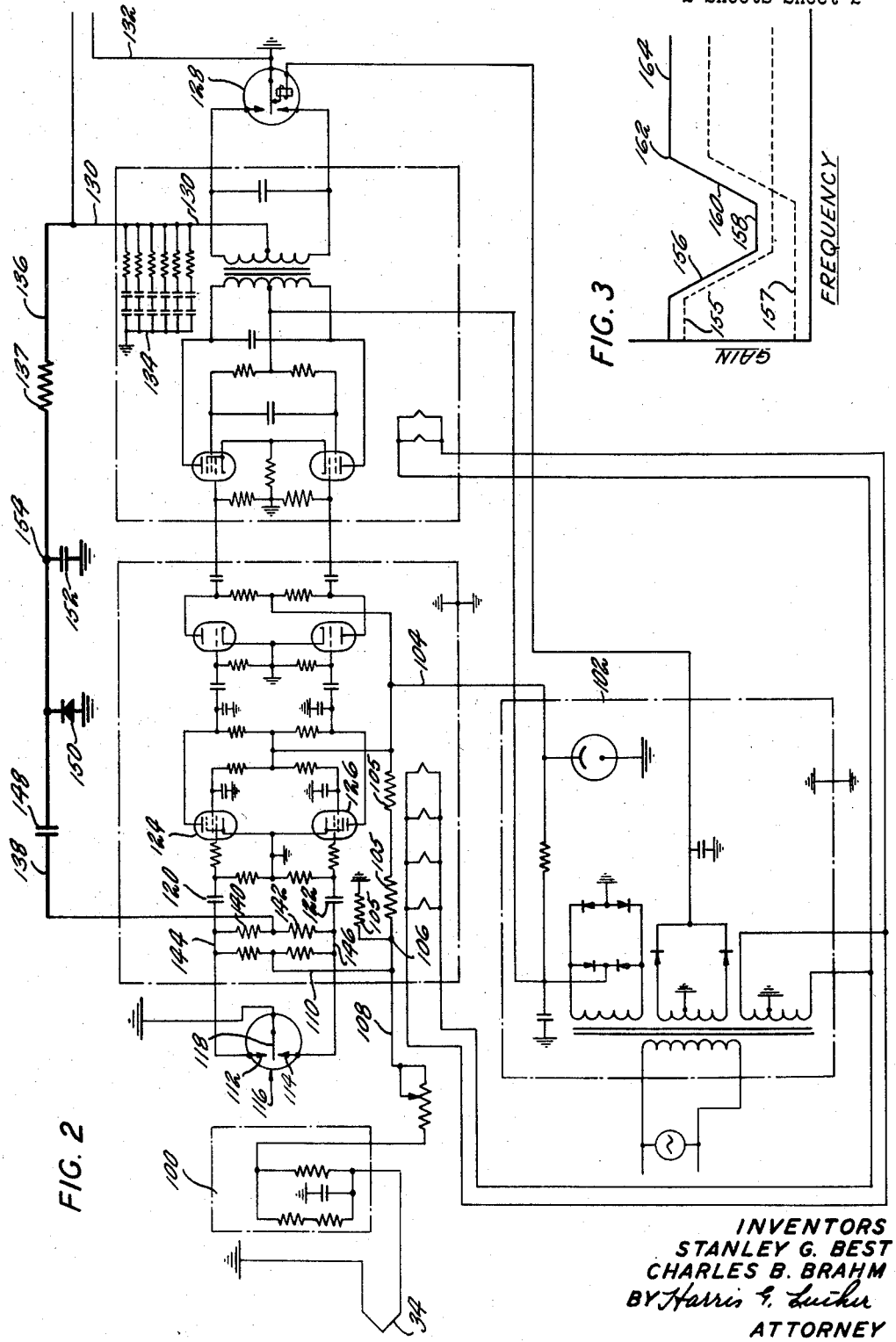
Fig. 2 is a schematic diagram of the temperature signal amplifying circuit including the power supply and the feed back circuit.
Fig. 3 is a diagram showing the variation of gain with frequency.

In analyzing the action of the amplifier with the above feed back circuit and considering the rate of change of the input signal as an indication of frequency and plotting the amplifier gain against frequency, there would result a curve as shown in Fig. 3 in which 0 frequency would represent a steady state condition at which there would be maximum amplifier gain. The full line curve is the result of two curves whose gain is multiplied together and if plotted on a logarithmic graph the full line curve represents the sum of the other two curves and the product of their values. Dotted line curve 155 shows the effect of the condenser 148 on the gain of the amplifier and the dotted line curve 157 shows the effect of the condenser 152 on the amplifier. The full line curve is obtained by adding the two dotted line curves. An increase in frequency would reduce the gain as shown by line 156 because of the charging of the condensers which at the low frequency would act as high impedance elements but would provide an increasing amount of feed back to reduce the amplifier gain as the frequency increased. The amplifier gain would remain at the low level 158 for a further increase in frequency depending upon the size of condenser 148 and its charging rate. Upon a still further increase in frequency, however, the condenser 152 would begin to act as a sufficient conductor to ground, reducing the voltage at junction 154 to reduce the strength of the feed back and increase the gain of the amplifier as shown at 160 until, as indicated by point 162, the condenser 152 would act substantially as a short circuit to ground and restore the amplifier to full gain as indicated by line 164. By this particular type of feed back, a system is provided which has a high static gain which drops off with the increase in frequency and upon a continued increase in frequency starts rising again with the higher frequency. This type of feed back also has a very high static sensitivity and a low dynamic sensitivity with a proportional type of system, that is, a system which makes corrections for error proportional to the error. It will be appreciated that with overtemperature signals on the amplifier output, rectifier 150 will act substantially as an open circuit and not have any grounding effect.

It is to be understood that the invention is not limited to the specific embodiment herein illustrated and described, and may be used in other ways without departure from its spirit as defined by the following claims.

I claim:

1. In control mechanism effecting corrective operation to restore a parameter to a preselected value in which error signals of one polarity are emitted when the parameter to be controlled is below a preselected parameter value and error signals of the opposite polarity are emitted when the parameter is above the selected value, means preventing corrective operation of the control mechanism in one direction by error signals on one side of said preselected value, a control circuit for said control mechanism having an amplifier having a D.C. input error signal and a D.C. output control signal, a feed back path for signals from said output to said input, an electrical accumulator means in said path chargeable in one direction by signals of one polarity and in the opposite direction by signals of the opposite polarity but otherwise blocking D.C. signals, the corrective operation of said control mechanism effecting discharge of said accumulator, said feed back connected to apply feed back voltage, including the voltage from reversing the charge on said accumulator, to said input in a degenerative sense to delay the operation of said control mechanism when changing from said one side of said selected parameter value to the other side of said value.

2. A device as claimed in claim 1 in which said one side is below said selected parameter value and the accumulator means comprises a condenser and resistor in series and has a time constant large enough to delay the operation of said control mechanism until after the parameter to be controlled has changed from below said selected value to above said selected value.

3. A device as claimed in claim 1 in which the control mechanism is the fuel control for an engine and the parameter to be controlled is an engine temperature which is responsive to fuel flow and signals on said one side are produced by undertemperature and in which the accumulator will delay operation of the fuel reducing portion of the fuel control for an appreciable time after the temperature has exceeded a predetermined maximum operating temperature.

4. A device as claimed in claim 1 in which a rectifier is connected with said feed back path between said output and said accumulator to limit the charge on said accumulator when the parameter to be controlled is on said one side of said selected value.

5. In a fuel control for a turbine engine in which the engine temperature may be varied by varying the fuel flow, a fuel supply, means creating an electrical temperature error signal proportional to the variation in engine temperature from a selected temperature, means amplifying said error signal, fuel flow regulating means including means responsive to said amplified error signal for reducing fuel flow to reduce engine temperature when the temperature exceeds said selected temperature, means rendering said reducing means ineffective to increase fuel flow when the temperature is below said selected temperature, said amplifying means having feed back mechanism including a condenser chargeable by below temperature fuel increasing signals and delaying the production of fuel decreasing signals by said amplifier when the engine changes rapidly from a below temperature condition to an above temperature condition.

References Cited in the file of this patent

UNITED STATES PATENTS

| | | |
|---|---|---|
| 2,297,543 | Eberhardt et al. | Sept. 29, 1942 |
| 2,513,454 | Couillard | July 4, 1950 |
| 2,587,294 | Dorbec | Feb. 26, 1952 |
| 2,607,528 | McWhirter et al. | Aug. 19, 1952 |
| 2,662,372 | Offner | Dec. 15, 1953 |
| 2,718,114 | Haworth et al. | Sept. 20, 1955 |
| 2,734,340 | Wood | Feb. 14, 1956 |
| 2,764,867 | Farkas | Oct. 2, 1956 |
| 2,766,584 | Stockinger | Oct. 16, 1956 |